US 8,934,571 B2

(12) United States Patent
Stewart et al.

(10) Patent No.: US 8,934,571 B2
(45) Date of Patent: Jan. 13, 2015

(54) TELECOMMUNICATIONS METHOD AND SYSTEM

(75) Inventors: Brian Stewart, Wishaw (GB); Scott McMeekin, Balfron (GB); Pingyu Liu, Hatfield (GB)

(73) Assignee: University Court of Glasgow Caledonian University, Glasgow (GB)

( * ) Notice: Subject to any disclaimer, the term of this patent is extended or adjusted under 35 U.S.C. 154(b) by 667 days.

(21) Appl. No.: 13/124,634

(22) PCT Filed: Oct. 16, 2009

(86) PCT No.: PCT/GB2009/002473
§ 371 (c)(1),
(2), (4) Date: Aug. 3, 2011

(87) PCT Pub. No.: WO2010/043871
PCT Pub. Date: Apr. 22, 2010

(65) Prior Publication Data
US 2011/0286537 A1    Nov. 24, 2011

(30) Foreign Application Priority Data
Oct. 16, 2008 (GB) .................................. 0818989.6

(51) Int. Cl.
H04L 25/49   (2006.01)
H04L 5/00    (2006.01)
H04L 27/26   (2006.01)

(52) U.S. Cl.
CPC ............ *H04L 5/0007* (2013.01); *H04L 5/0048* (2013.01); *H04L 27/2613* (2013.01)
USPC ........................................................ 375/296

(58) Field of Classification Search
USPC .............. 375/295, 296; 455/91, 114.2, 114.3;
370/203, 210, 464, 498, 500
See application file for complete search history.

(56) References Cited

U.S. PATENT DOCUMENTS

| | | | |
|---|---|---|---|
| 2004/0146115 A1* | 7/2004 | Feng et al. ..................... | 375/260 |
| 2005/0141558 A1* | 6/2005 | Connors ....................... | 370/469 |
| 2005/0265226 A1 | 12/2005 | Shen et al. | |
| 2006/0269011 A1* | 11/2006 | Stewart ......................... | 375/269 |
| 2009/0011722 A1* | 1/2009 | Kleider et al. ................ | 455/101 |

FOREIGN PATENT DOCUMENTS

| | | |
|---|---|---|
| EP | 1357718 A2 | 10/2003 |
| JP | 2005-524278 A | 8/2005 |
| JP | 2005-341056 A | 12/2005 |
| JP | 2008-503169 A | 1/2008 |
| JP | 2008-219637 A | 9/2008 |
| WO | WO 2004/084513 A2 | 9/2004 |
| WO | WO 2006/012306 A1 | 2/2006 |

OTHER PUBLICATIONS

International Search Report of corresponding international Application No. PCT/GB2009/002473, mailed Mar. 3, 2010.

(Continued)

*Primary Examiner* — Vineeta Panwalkar
(74) *Attorney, Agent, or Firm* — Alston & Bird LLP

(57) ABSTRACT

A method for encoding data for transmitting over a telecommunications network comprising: embedding at least one control or pilot data block within a plurality of real data blocks in the frequency domain; transforming real data in the real data blocks with control or pilot data in the control or pilot data blocks; and modulating the real data blocks and control or pilot data block with one or more transmission sub-carrier signals.

10 Claims, 10 Drawing Sheets

(56) References Cited

OTHER PUBLICATIONS

Written Opinion of corresponding international Application No. PCT/GB2009/002473, mailed Mar. 3, 2010.

Japan Patent Office, Office Action for Application No. 2011-531553, Aug. 20, 2013, 7 pages, Japan.
Japan Patent Office, Office Action for Application No. 2011-531553, Feb. 4, 2014, 4 pages, Japan.

* cited by examiner

64QAM Mobile WiMax

64QAM Mobile WiMax ECM

TELECOMMUNICATIONS METHOD AND SYSTEM

CROSS REFERENCE TO RELATED APPLICATIONS

This application is a national stage application, filed under 35 U.S.C. §371, of International Application No. PCT/GB2009/002473, filed Oct. 16, 2009, which claims priority to United Kingdom Application No. 0818989.6, filed Oct. 16, 2008, all of which are hereby incorporated by reference in their entirety.

The present invention relates to a method and a system for encoding and decoding telecommunication signals.

BACKGROUND OF THE INVENTION

Most broadband OFDM (Orthogonal Frequency Division Multiplexing) systems comprise a number of modulated data subcarriers, which are transmitted over large frequency bandwidths. The advantage of OFDM is that it improves the data throughput by lowering the data rates on each subcarrier but increasing the data throughput by simply transmitting more subcarriers. Decreasing the data rate on each sub-carrier when noise or channel problems exist allows the increased data transfer to exist. These techniques have proven very effective in many wireless and fixed wire systems such as xDSL, IEEE802.11, IEEE802.16 and LTE systems. High data rates are therefore possible. Additional methods of reducing inter-symbol interference and multi-channel fading are also incorporated through including a Guard Interval or Cyclic prefix extension or inserting pilot tones on fixed location subcarriers within the N subcarrier frame transmission. Although OFDM provides many advantages, two problems associated with such systems are high instantaneous values of PAPR (Peak to Average Power Ratios) and fast fading multi-path mobile channel.

Due to the summation of the individual subcarriers at a transmitter output, there is a probability that very high instantaneous values of power will exist. Unfortunately the dynamic range of the transmitter high power amplifiers (HPA) is usually lower than the dynamic range of the PAPR variations thus severely distorting the signals. In addition, as most HPAs are non-linear in nature distortion of the high PAPR signals always exists. The consequences of high PAPR values is the introduction of bit errors at the receiver as well as potential inter-channel or inter-frequency interference due to frequency spectral splatter arising from the HPA distortion. Numerous solutions to reducing PAPR in OFDM systems exist and these include, clipping, filtering, phase shifting, block coding, selected mapping, and tone insertion techniques. However, these have their own disadvantages, which include, introduction of distortion and particularly the requirement of transmitting side-information or extra information. This extra information is required to allow the receiver to know how the data or pilots have been modified to reduce the PAPR causing a reduction in throughout and also influencing the PAPR itself.

Mobile OFDM systems suffer from the presence of multi-path channel fading. As the fading becomes severe, particularly at high mobile velocities or high GHz frequency transmission carriers, multi-path fading becomes more difficult to eliminate causing a dramatic decrease in Quality of Service as the bit error rate (BER) increases and the data rate reduces. The solution to helping eliminate multipath fading is the insertion of pilot tones or training sequences within OFDM systems. These pilot tones allow receiver equalisers to evaluate the channel conditions and to correct the data. The main problem with pilot tones is that they are only of limited ability in correcting the data. The channel conditions can vary significantly from subcarrier to subcarrier and from frame to frame in rapidly changing fading environments thus not limiting the lower bound on BER.

WO2004/084513, the contents of which are incorporated herein by reference, describes the concept of embedding different forms of pilots into OFDM transmissions. In this, a control data block is embedded within a plurality of real data blocks. The real data blocks are modulated with one or more transmission sub-carrier signals and the control data block is modulated with every transmission sub-carrier used to modulate the real data blocks. The techniques described in WO2004/084513 allow a received signal to be decoded without knowledge of the control phase angle.

Although WO2004/084513 addresses the issue of dynamic variability between time frames, it does not address the problem of dynamic variability between individual subcarriers within an OFDM frame.

SUMMARY OF THE INVENTION

According to one aspect of the invention, there is provided a method for encoding data for transmitting over a telecommunications network comprising: embedding at least one control data block within a plurality of real data blocks in the frequency domain; modulating the real data blocks with one or more transmission sub-carrier signals; and modulating the control data block with every transmission sub-carrier used to modulate the real data blocks.

According to another aspect of the present invention there is provided a method for encoding data for transmitting over a telecommunications network comprising: embedding at least one control or pilot data block within a plurality of real data blocks in the frequency domain; convoluting real data in the real data blocks with control or pilot data in the control or pilot data blocks; and modulating the real data blocks and control or pilot data block with one or more transmission sub-carrier signals.

The method may involve grouping together two or more real data blocks and at least one control data block to form a cluster or group and within the cluster convoluting real data in each real data block with at least some of the control data in the control data block. Multiple clusters or groups may be formed. Multiple control data blocks may be provided in each cluster or group and each real data block may be convoluted with at least some control data in each of the control data blocks. Multiple, identical control data blocks may be provided.

The step of convoluting may involve phase angle convoluting each real data block with a phase angle of the corresponding entry in the control data block.

Each phase angle for the control data block may be randomly assigned.

Each entry of the control data block may have a phase angle that is a function of the phase angles of the corresponding entries of the real data block. The phase angle of each entry of the control data block may be the sum of the phase angles of the corresponding entries of real data blocks.

Convoluting may comprise subtracting from the phase angle of each real data subcarrier all of the phase angles of all of the corresponding entries of all of the other real data subcarriers.

The control or pilot data may be embedded substantially in the middle of the real data block.

The method may involve applying a phase shift to each control or pilot so that the phase follows a predetermined sequence.

The method may involve encrypting the real and control data that is to be transmitted. This may involve using a phase scaling factor for the control data and a different phase scaling factor for the real data.

According to another aspect of the invention there is provided a method for decoding data received over a telecommunications network, the method comprising: receiving a modulated control block embedded in a plurality of modulated real data blocks in the frequency domain, identifying the received control data block, and estimating the real data using each entry of the received control data block and the corresponding entries of the received data blocks. Estimating may involve dividing each entry of the received real data with the corresponding entry of the control data.

According to another aspect of the invention, there is provided a method for optimising PAPR in data for transmitted over a telecommunications network, the method comprising: embedding a control data block within a plurality of real data blocks; modulating the real data blocks with one or more transmission sub-carrier signals; modulating the control data block with every transmission sub-carrier used to modulate the real data blocks; adding a phase shift to every modulated data block and determining the PAPR for that phase shift; varying the phase shift added and determining the PAPR for that phase shift and repeating this to determine a phase shift that provides an optimum PAPR. This can be done in both the time and frequency domain.

According to yet another aspect of the present invention, there is provided a method for transmitting data over a telecommunications network comprising: embedding at least one control data block within a plurality of real data blocks in the frequency and time domain to form an m by n cluster, wherein m and n are both greater than one; modulating the real data blocks with one or more transmission sub-carrier signals; and modulating the at least one control data block with every transmission sub-carrier used to modulate the real data blocks.

Where a single control block is provided, it may be located at any position within the cluster, for example, wherein the cluster is symmetric the control block may be at the centre. Where multiple control data blocks are provided, they may be identical. Additionally or alternatively, where multiple control data blocks are provided the number of control data blocks may be the same as the number of real data blocks.

According to still another aspect of the present invention, there is provided a method for transmitting data over a telecommunications network comprising: embedding at least two identical control data blocks within a plurality of real data blocks to form a cluster; modulating the real data blocks with one or more transmission sub-carrier signals; and modulating the at least two control data blocks with every transmission sub-carrier used to modulate the real data blocks.

The real data blocks may be in the frequency and time domain and the cluster may be an m by n cluster, wherein m and n are integers greater than one.

The number of control data blocks may be the same as the number of real data blocks. The number of control blocks may be more than the number of real data blocks.

According to a yet further aspect of the invention, there is provided a method for decoding a signal that was transmitted with two or more identical modulated control data blocks, the method comprising identifying the at least two modulated control blocks and using these to provide an estimate of transmission channel distortion or variation.

The method may involve dividing one of the received modulated control blocks by another of the received control blocks. Since the transmitted control blocks were identical, then without channel variation or distortion the result of this division should be one. In practice, however, this is unlikely to be the case, and any variation from a unitary value is indicative of a relative measure of channel variation. This relative measure can be used to correct the decoding of the real data blocks.

The various methods of the present invention may be implemented in any hardware or software or computer based system or device. For example, any telecommunications device, such as a personal mobile communications device or mobile/radio telephone or a computer with telecommunications capabilities or a digital broadcast radio or a digital television or set top box or any wireless networked device.

BRIEF DESCRIPTION OF THE DRAWINGS

Various aspects of the invention will now be described by way of example only and with reference to the accompanying drawings, of which.

DETAILED DESCRIPTION OF THE DRAWINGS

Figure 1:
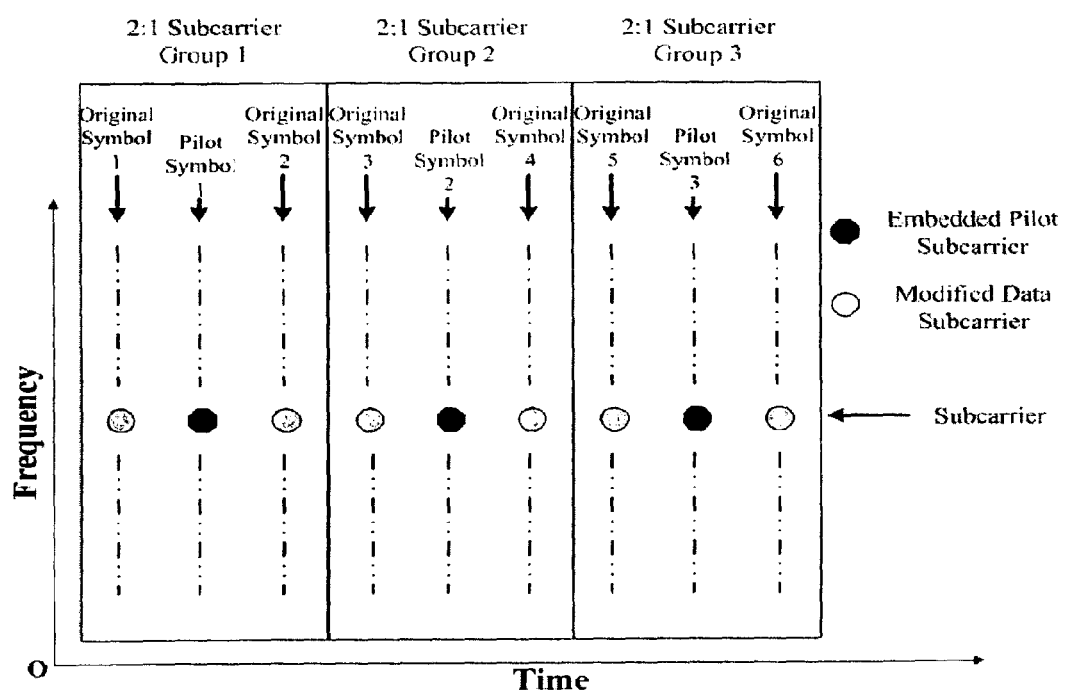
FIG. 1 is a time domain subcarrier map for a 2:1 intra-frame embedded convolution modulation (ECM) technique.

The present invention builds on the basic principles of WO2004/084513. Some of the basic techniques of WO2004/084513 will now be described. These will be referred to herein generally as Embedded Convolution Modulation (ECM).

In WO2004/084513, a pilot symbol data block with control/calibration information is embedded within an N block M sub-carrier data transmission stream in OFDM. All M sub-carriers are used in the transmission of the pilot/control symbol itself. Each data block is preferably convoluted with the pilot symbol information. The data block and the pilot control block may be convoluted with all the transmitted sub-carrier data phase angles. On reception, the received data is de-convoluted with the use of the pilot control block.

A series of N data blocks is transmitted and received sequentially in an M sub-carrier OFDM system, see below:

| Data1 | Data3 | ... | Pilotk | ... | Data N-1 | DataN |
|---|---|---|---|---|---|---|

It is assumed that the channel distortion, though different for each sub-carrier, remains constant throughout the duration of the N block transmission. A pilot control data block, block k, is embedded as one of the N data blocks and is used as control information for decoding and channel distortion elimination purposes. A more complex implementation could include more than one pilot control data block in any general N data block transmission.

Assuming the OFDM sub-carrier representation, each of the N data blocks has M sub-carriers, with each sub-carrier containing modulated information, which can be represented by a point in a scatter plot denoted through the appropriate I and Q co-ordinate values. In OFDM, the encoded elements of each sub-carrier in the N Block transmission may be represented as:

$$X_{nm0} = I_{nm0} + jQ_{nm0} = A_{nm0}\exp(j\phi_{nm0}) \; n=1, 2 \ldots N;$$
$$m=1, 2 \ldots M$$

where $X_{nm0}$=the original encoded quadrature signal in Data Block n, subcarrier m; $I_{nm0}$=the original I encoded data in Data Block n, subcarrier m; $Q_{nm0}$=the original Q encoded data in Data Block n, subcarrier m. The subscript "0" refers to the original true value of any component. The above information may be represented in the form of a transmission sequence of the sub-carriers within the N Blocks, viz.

$$\begin{matrix} \text{Data Block} & \text{Data block} & \text{Pilot Data Block} & & \text{Data Block} \\ 1 & 2 & k & & N \\ \begin{bmatrix} X_{110} \\ X_{120} \\ \vdots \\ X_{1M0} \end{bmatrix} & \begin{bmatrix} X_{210} \\ X_{220} \\ \vdots \\ X_{2M0} \end{bmatrix} & \cdots \begin{bmatrix} X_{k10} \\ X_{k20} \\ \vdots \\ X_{kM0} \end{bmatrix} \cdots & & \begin{bmatrix} X_{N10} \\ X_{N20} \\ \vdots \\ X_{NM0} \end{bmatrix} \end{matrix}$$

where: $X_{110}$=original encoded quadrature signal in Data Block 1, subcarrier 1, and $X_{210}$=original encoded quadrature signal in Data Block 2, subcarrier 1, etc.

To encode the message, firstly, the pilot control data block k has M sub-carriers with predetermined quadrature transmission values given by:

$$X_{km0} = I_{km0} + jQ_{km0}$$

where $$I_{km0} = A_{km0} \cos\phi_{km0} \text{ and } Q_{km0} = A_{km0} \sin\phi_{km0}(m=1, 2 \ldots M).$$

Generally, the pilot data block k should be sent in the middle of the N block transmission so that it represents an effective "middle" measure of channel distortion and attenuation. Of course the system could be adaptive N and k dependent, based on the severity of the channel distortion conditions.

All the M transmitted sub-carriers in the N data blocks, apart from the sub-carriers in data block k, are phase angle convoluted with the pilot control data block phase angles $\phi_{km0}$. In a first example, the convolution is simple, namely that the $m^{th}$ sub-carrier phase angle of block k, i.e. $\phi_{km0}$ is added onto the $m^{th}$ sub-carrier phase angles $\phi_{nm0}$ of the other N data blocks prior to new encoding and forwarding to the IFFT. In other words prior to modulation, each data point on the constellation diagram, intended for modulation onto sub-carrier m, is rotated by $\phi_{km0}$ to provide new convoluted/and Q values for modulation onto the sub-carrier.

The new convolution encoded data blocks to be transmitted are then given by:

$$X_{nm0} = A_{nm0}\exp(j(\phi_{nm0} + \phi_{km0})) = I_{nm0}^c + jQ_{nm0}^c \; n=1,$$
$$2 \ldots N(n \neq k); m=1, 2 \ldots M$$

where $I_{nm0}^c$ and $Q_{nm0}^c$ are the true quadrature values of the data to be modulated after convolution has taken place.

The transmitted data block sequence with sub-carrier information can now be represented as, where the pilot data can be considered as a block of pilot data subcarriers:

$$\begin{matrix} \text{Data Block 1} & \text{Data Block 2} \\ \begin{bmatrix} A_{110}\exp(j(\phi_{110} + \phi_{k10})) \\ A_{120}\exp(j(\phi_{120} + \phi_{k20})) \\ \vdots \\ A_{1M0}\exp(j(\phi_{1M0} + \phi_{kM0})) \end{bmatrix} & \begin{bmatrix} A_{210}\exp(j(\phi_{210} + \phi_{k10})) \\ A_{220}\exp(j(\phi_{220} + \phi_{k20})) \\ \vdots \\ A_{2M0}\exp(j(\phi_{2M0} + \phi_{kM0})) \end{bmatrix} \end{matrix}$$

$$\begin{matrix} \text{Pilot Data Block } k \\ \cdots \begin{bmatrix} A_{k10}\exp(j\phi_{k10}) \\ A_{k20}\exp(j\phi_{k20}) \\ \vdots \\ A_{kM0}\exp(j\phi_{kM0}) \end{bmatrix} \cdots \begin{bmatrix} A_{N10}\exp(j(\phi_{N10} + \phi_{k10})) \\ A_{N20}\exp(j(\phi_{N20} + \phi_{k20})) \\ \vdots \\ A_{NM0}\exp(j(\phi_{NM0} + \phi_{kM0})) \end{bmatrix} \\ \text{Data Block N} \end{matrix}$$

This sequence is transmitted to a coherent detector system. After suffering from the effects of attenuation and channel distortion, the in-phase and quadrature components are measured as:

$$X_{nm} = I_{nm} + jQ_{nm} = A_{nm}\exp(\phi_{nm})$$

which can be expressed in the form:

$$X_{nm} = I_{nm} + jQ_{nm} = (I_{nm0}^c + jQ_{nm0}^c)A_{att}H = A_{nm0}\exp(j(\phi_{nm0} + \phi_{km0}))A_{att}H(n \neq k)$$

$$X_{km} = I_{km} + jQ_{km} = (I_{km0} + jQ_{km0})A_{att}H = A_{km0}\exp(j\phi_{km0})A_{att}H(n=k).$$

Here, $I_{nm}$, $Q_{nm}$ (n=1, 2, . . . N) are the decoded/and Q components of the m sub-carriers of the N data blocks in the presence of attenuation and channel distortion; $I_{nm0}^c$, $Q_{mn0}^c$ are the transmitted original convoluted quadrature components referenced to a predefined normalised encoding constellation plot; $A_{nm0}$, $\phi_{nm0}$ are the amplitude and phase angle values for the original (non-convoluted) data in each data block, again referenced to a predefined normalised constellation plot; $A_{att}$ is the attenuation factor for the signals, and H is the channel distortion representing the effects of signal distortion echo.

Transmitter power gain could be included in each expression. Indeed it could be included within $A_{att}$. However, it is possible to eliminate both $A_{att}$ and channel distortion and recover the original transmitted normalised I and Q magnitudes based on the data block k transmitted values, as long as $A_{att}H$ is considered constant, or changes little, over the N block transmission Providing a minimised crest factor for the pilot control data block symbol is a problem for OFDM systems. However, this can be resolved in part by using a random phase assignment for each sub-carrier in the pilot control data block. As long as the phase $\phi_{km0}$ assignments for each sub-carrier in the pilot control data block are defined, then the appropriate sub-carrier $\phi_{km0}$ values can be added to each original sub-carrier phase angle prior to modulation for all data block transmissions. Once the data is modulated with the sub-carriers, this means that for sub-carrier 1, $\phi_{k10}$ is added to the phase angles of all the first sub-carriers in the (N−1) Data Blocks; $\phi_{k20}$ added to the phase angles of all second sub-carriers etc.

Dividing each of the received $X_{nm}$ signals by the received control data block signal $X_{km}$ eliminates $A_{att}H$ resulting in:

$$\frac{X_{nm}}{X_{km}} = \frac{(I_{nm} + jQ_{nm})}{(I_{nm} + jQ_{km})} = \frac{A_{nm0}\exp(j(\phi_{nm0} + \phi_{km0}))A_{att}H}{A_{km0}\exp(j\phi_{km0})A_{att}H} = \frac{A_{nm0}}{A_{km0}}\exp(j\phi_{nm0})$$

In terms of measured $I_{nm}$ and $Q_{nm}$ values, then $$\frac{(I_{nm} + jQ_{nm})}{(I_{nm} + jQ_{km})} =$$

$$\frac{(I_{nm}I_{km} + Q_{nm}Q_{km}) + j(I_{km}Q_{nm} - I_{nm}Q_{km})}{(I_{km}^2 + Q_{km}^2)} = \frac{A_{nm0}}{A_{km0}}\exp(j\phi_{nm0})$$

$A_{att}H$, if required for each sub-carrier channel, can be estimated using:

$$A_{att}H = \frac{X_{km}}{A_{km0}\exp(j\phi_{km0})}.$$

After some simple manipulation of complex numbers, and equating real and imaginary parts, the following algorithms result for estimation of the normalised original transmitted amplitude and phase components for each data block and sub-carrier. It should be noted that these are relative to the original normalised transmitted data block k parameters, based on the measured coherent detected quadrature components, i.e.

$$\hat{A}_{nm} = A_{km0}\sqrt{\left[\frac{I_{nm}^2 + Q_{nm}^2}{I_{km}^2 + Q_{km}^2}\right]}$$

$n = 1, 2 \ldots N(n \neq k); m = 1, 2 \ldots M;$ $$\hat{\phi}_{nm} = \tan^{-1}\left[\frac{I_{km}Q_{nm} - I_{nm}Q_{km}}{I_{nm}I_{km} + Q_{nm}Q_{km}}\right]$$

$n = 1, 2 \ldots N(n \neq k); m = 1, 2 \ldots M;$

In these equations $\hat{A}_{nm}$ denotes the estimate of the true amplitude $A_{nm0}$ of data block n sub-carrier m relative to the true normalised known value $A_{km0}$, and $\hat{\phi}_{nm}$ denotes the estimate of the true phase component $\phi_{nm0}$ of the originally transmitted data block n sub-carrier m. Estimates of the true orthogonal components $I_{nm0}$, $Q_{nm0}$ of data block n sub-carrier m, denoted by $\hat{I}_{nm}, \hat{Q}_{nm}$ may also be evaluated relative to known data block k parameters, and after some manipulation of the equations above, can be evaluated as follows:

$$\hat{I}_{nm} = A_{km0}\frac{(I_{nm}I_{km} + Q_{nm}Q_{km})}{(I_{km}^2 + Q_{km}^2)} = \hat{A}_{nm}\cos\hat{\phi}_{nm}$$

$n = 1, 2, \ldots N(n \neq k)$ $$\hat{Q}_{nm} = A_{km0}\frac{(I_{km}Q_{nm} - I_{nm}Q_{km})}{(I_{km}^2 + Q_{km}^2)} = \hat{A}_{nm}\sin\hat{\phi}_{nm}$$

$n = 1, 2, \ldots N(n \neq k)$

An alternative encoding scheme may be implemented without convoluting $\phi_{k0}$ within the transmitted block signals, but still embeds the control data block k in the data block transmission i.e.

$$X_{nm} = I_{nm} + jQ_{nm} = (I_{nm0} + jQ_{nm0})A_{att}H = A_{nm0}\exp(j\phi_{nm0})A_{att}H (n \neq k)$$

$$X_{km} = I_{km} + jQ_{km} = (I_{km0} + jQ_{km0})A_{att}H = A_{km0}\exp(j\phi_{km0})A_{att}H$$

For this situation, it is easy to show that the decoding algorithms become:

$$\hat{A}_{nm} = A_{km0}\sqrt{\left[\frac{I_{nm}^2 + Q_{nm}^2}{I_{km}^2 + Q_{km}^2}\right]}$$

$n = 1, 2, \ldots N(n \neq k)$ $$\hat{\phi}_{nm} = \tan^{-1}\left[\frac{I_{km}Q_{nm} - I_{nm}Q_{km}}{I_{nm}I_{km} + Q_{nm}Q_{km}}\right] + \phi_{km0}$$

$n = 1, 2, \ldots N(n \neq k).$ $$\hat{I}_{nm} = \hat{A}_{nm}\cos\hat{\phi}_{nm}$$

$n = 1, 2, \ldots N(n \neq k)$ $$\hat{Q}_{nm} = \hat{A}_{nm}\sin\hat{\phi}_{nm}$$

$n = 1, 2, \ldots N(n \neq k)$

In another technique, N data blocks are transmitted sequentially with the same echo channel distortion H presumed to exist for the duration of the N block transmissions. Again a data block k is embedded somewhere in the stream as a pilot control data block for decoding purposes with known normalised true quadrature values given by:

$$I_{km0} = A_{km0}\cos\phi_{km0} \text{ and } Q_{km0} = A_{km0}\sin\phi_{km0}$$

In addition, as in the first technique, the phase angles of the original data blocks are convoluted with the control data block phase angle, and embedded in the transmitted data blocks. However, in this case this is done by assuming that the actual data to be transmitted for each of the N Blocks of M sub-carriers is given by:

Data in Block $n$ subcarrier $m = A_{nm0}\exp(j\phi_{nm0})(n \neq k)$

The general encoding of the transmitted data for N data blocks using the second technique is defined for each sub-carrier m as follows:

$$X_{1m0} = I_{1m0}^c + jQ_{1m0}^c = A_{1m0}\exp(j(\alpha_{1m}\phi_{1m0} - \alpha_{2m}\phi_{2m0} - \alpha_{3m}\phi_{3m0} - \ldots - \alpha_{Nm}\phi_{Nm0}))$$

$$X_{2m0} = I_{2m0}^c + jQ_{2m0}^c = A_{2m0}\exp(j(\alpha_{2m}\phi_{2m0} - \alpha_{1m}\phi_{1m0} - \alpha_{3m}\phi_{3m0} - \ldots - \alpha_{Nm}\phi_{Nm0}))$$

.

.

.

$$X_{km0} = I_{km0}^c + jQ_{km0}^c = A_{km0}\exp(-j(\alpha_{1m}\phi_{1m0} + \alpha_{2m}\phi_{2m0} + \alpha_{3m}\phi_{3m0} + \ldots + \alpha_{Nm}\phi_{Nm0}))$$

.

.

.

$$X_{Nm0} = I_{Nm0}^c + jQ_{Nm0}^c = A_{Nm0}\exp(j(\alpha_{Nm}\phi_{Nm0} - \alpha_{1m}\phi_{1m0} - \alpha_{2m}\phi_{2m0} - \ldots - \alpha_{(N-1)m}\phi_{(N-1)m0}))$$

In this case, the actual data blocks have a convoluted phase angle comprising the subtraction of all the other transmitted (N−1) data block phase angles, which use the same sub-carrier. The control data block has a phase angle that is simply the addition of all the sub-carrier data block phase angles. The terms $\alpha_{nm}$ (n=1, 2 ... N) are constants associated with the convolution of each encoded phase angle on the sub-carrier. The above encoding algorithms for each sub-carrier can be re-written in the form:

$$X_{nm0} = I^c_{nm0} + jQ^c_{nm0} = A_{nm0}\exp\left(j\left(2\alpha_{nm}\phi_{nm0} - \sum_{n=1(n\neq k)}^{N}\alpha_{nm}\phi_{nm0}\right)\right)$$

$(n \neq k)$ $$X_{km0} = I^c_{km0} + jQ^c_{km0} = A_{km0}\exp\left(-j\left(\sum_{n=1(n\neq k)}^{N}\alpha_{nm}\phi_{nm0}\right)\right)$$

Although the amplitudes of the pilot symbol sub-carriers can be increased, the pilot control data block now has a more random assignment of phase angles across all sub-carriers. This arises because each sub-carrier of the pilot control data block requires the addition of all phase angles from the same sub-carriers in all the transmitted data blocks. The effect of this is to randomly assign pilot control data block sub-carrier phase angles dependent on the data being transmitted, resulting in a reduced crest factor simply by design and not by external assignment of random carrier phases.

At the receiver, the coherent detector provides a measure of the convoluted I and Q values, which have now been affected through channel distortion. These are denoted by:

$X_{nm} =$ $$I_{nm} + jQ_{nm} = A_{nm0}\exp\left(j\left(2\alpha_{nm}\phi_{nm0} - \sum_{n=1(n\neq k)}^{N}\alpha_{nm}\phi_{nm0}\right)\right)A_{att}H(n\neq k)$$

$$X_{km} = I_{km} + jQ_{km} = A_{km0}\exp\left(-j\left(\sum_{n=1(n\neq k)}^{N}\alpha_{nm}\phi_{nm0}\right)\right)A_{att}H$$

The transmission of the sub-carriers within the N blocks may be represented as:

Data Block 1 Data Block 2
$$\begin{bmatrix} X_{110} \\ X_{120} \\ \vdots \\ X_{1M0} \end{bmatrix} \begin{bmatrix} X_{210} \\ X_{220} \\ \vdots \\ X_{2M0} \end{bmatrix} \cdots$$

Pilot Control Block k  Data Block N
$$\begin{bmatrix} X_{k10} \\ X_{k20} \\ \vdots \\ X_{kM0} \end{bmatrix} \cdots \begin{bmatrix} X_{N10} \\ X_{N20} \\ \vdots \\ X_{NM0} \end{bmatrix}$$

Decoding is achieved in a similar way to the first technique by dividing the received sub-carrier signals by the received sub-carrier pilot control block k signals. This results in the following:

$$\frac{X_{nm}}{X_{km}} = \frac{(I_{nm} + jQ_{nm})}{(I_{nm} + jQ_{km})} = \frac{A_{nm0}\exp\left(j\left(2\alpha_{nm}\phi_{nm0} - \sum_{n=1(n\neq k)}^{N}\alpha_{nm}\phi_{nm0}\right)\right)A_{att}H}{A_{km0}\exp\left(-j\left(\sum_{n=1(n\neq k)}^{N}\alpha_{nm}\phi_{nm0}\right)\right)A_{att}H} =$$

$$\frac{A_{nm0}}{A_{km0}}\exp(j2\alpha_{nm}\phi_{nm0})$$

In terms of measured $I_{nm}$ and $Q_{nm}$ values, then $$\frac{(I_{nm} + jQ_{nm})}{(I_{nm} + jQ_{km})} =$$

$$\frac{(I_{nm}I_{km} + Q_{nm}Q_{km}) + j(I_{km}Q_{nm} - I_{nm}Q_{km})}{(I^2_{km} + Q^2_{km})} = \frac{A_{nm0}}{A_{km0}}\exp(j2\alpha_{nm}\phi_{nm0})$$

It is easy to show that estimates of the true normalised amplitudes and phase angles for each original set of data which has been encoded using the second technique are given by:

$$\hat{A}_{nm} = A_{km0}\sqrt{\left[\frac{I^2_{nm} + Q^2_{nm}}{I^2_{km} + Q^2_{km}}\right]} \; n = 1, 2, \ldots N$$

$n \neq k$ $$\hat{\phi}_{nm} = \frac{1}{2\alpha_{nm}}\tan^{-1}\left[\frac{I_{km}Q_{nm} - I_{nm}Q_{km}}{I_{nm}I_{km} + Q_{nm}Q_{km}}\right] n = 1, 2, \ldots N$$

$n \neq k$

One of the simplest embodiments of ECM is to partition the symbol subcarrier transmissions into consecutive subcarrier groupings of 2, 3 or 4 . . . etc. FIG. 1 shows an example of frequency-time domain mapping of a basic 2:1 ECM interframe convolution method. In 2:1 ECM, the transmitted sub-carriers are collected together into consecutive groups of two, [[$S_1$ $S_2$] [$S_3$ $S_4$] . . . ].

Within each grouping of two data subcarriers a new sub-carrier denoted by E is constructed and embedded in the middle between the original 2 subcarriers within each grouping. The original subcarriers in the groups i.e. $S_1$, $S_2$, $S_3$ . . . are then modified in some way to form new subcarriers denoted by $D_1$, $D_2$, $D_3$ . . . etc. The new transmission of the subcarrier clusters in each frame is then represented by

[[$D_1$ $E_1$ $D_2$] [$D_3$ $E_2$ $D_4$] . . . ].

This new embedded subcarrier is defined by $E=A_E e^{j\theta_E}$, where $A_E$ and $\theta_E$ represent the amplitude and phase of the subcarrier. The embedded subcarrier has a phase $\theta_E$ constructed form of simple convolution of the phases of the two data carrying subcarriers within each group, thus $\theta_E=\theta_E(\phi_1, \phi_2)$ The amplitude $A_E$ is open to choice but is generally selected to be a constant (usually ≥1) which is then known and fixed in the receiver. The amplitudes of the original data subcarriers remain unchanged in the simplest form of ECM. However, the constructed embedded subcarrier phase $\theta_E$ is also added to the phases of the two data subcarriers to produce modified data subcarrier phases for the two data subcarriers within the group. The resulting transmission sequence for the frequency subcarrier information is then $$S_{ECM} = [\,[D_1\ E_1\ D_2]\ [D_3\ E_2\ D_4]\ \ldots\,] \quad (14)$$

$$[\,[A_1 e^{j(\phi_1+\theta_{E1})}\ A_{E1} e^{j\theta_{E1}}\ A_2 e^{j(\phi_2+\theta_{E1})}\,]$$

$$[A_3 e^{j(\phi_3+\theta_{E2})}\ A_{E2} e^{j\theta_{E2}}\ A_4 e^{j(\phi_4+\theta_{E2})}\,]\ \ldots\,]$$

where $A_{E1}, \theta_{E1}, A_{E2}, \phi_{E2}$ represent the embedded subcarrier amplitude and phase for ECM subcarrier Groups 1 and 2 respectively, and $A_1$, $(\phi_1+\theta_{E1})$, $A_2$, $(\phi_2+\phi_{E1})$ and $A_3$, $(\phi_3+\theta_{E2})$, $A_4$, $(\phi_4+\theta_{E2})$ the amplitudes and phases of the modified first four subcarriers of the original OFDM transmissions. Hence, all three subcarriers within each ECM subcarrier group carry an embedded convolution of the transmission information related to the two data subcarriers intended for transmission.

On reception, each subcarrier of the 2:1 ECM transmissions is affected by rapid frequency selective channel conditions e.g. multi-path fading distortion. Consider for simplicity ECM subcarrier Group 1 from FIG. 1 represented in equation (14). The presumption is that within this 2:1 ECM subcarrier Group transmission, the channel influence will not have changed significantly, to a first approximation (similar to FDRM subcarrier transmissions), between subcarriers $D_1$ and $E_1$. Similarly to a first approximation, the channel will not have changed significantly between subcarriers $E_1$ and $D_2$. If this is the situation then, as shown below, it is possible to eliminate the influence of the channel variations between $D_1$ and $E_1$, and $E_1$ and $D_2$ and be able to recover the original OFDM subcarriers $S_1$ and $S_2$. The reason for the choice of $E_1$ in the middle of the transmission Group is now clear. Even if the channel changes more dramatically over the three subcarrier group transmission, the variation in channel between $D_1$ and $E_1$, and $E_1$ and $D_2$ will not be as severe and actually helps eliminate more accurately the channel in fast fading environments between subcarriers. This channel elimination process is outlined in more detail as follows.

Consider again 2:1 ECM transmission Group 1. Let for simplicity H represent the fast fading channel that influences this Group of subcarriers. The measured receiver Group 1 set of subcarriers affected by the channel, denoted by $W_{ECM}$, is represented by $$W_{ECM} = [X_1 Z_1 X_2] \quad (15)$$

where $$X_1 = I_{X1} + jQ_{X1} = D_1 H = A_1 e^{j(\phi_1+\theta_1)} H$$

$$Z_1 = I_{Z1} + jQ_{Z1} = E_1 H = A_{E1} e^{j(\theta_{E1})} H$$

$$X_2 = I_{X2} + jQ_{X2} = D_2 H = A_2 e^{j(\phi_2+\theta_1)} H \quad (16)$$

where $I_{X1}$, $Q_{X1}$, $I_{E1}$, $Q_{E2}$, $I_{X2}$, $Q_{X2}$ represent the receiver I-Q constellation points of $D_1$, $E_1$ and $D_2$ arising from the presence the channel.

Decoding is achieved as follows. The received signal $X_1$ is divided by $Z_1$ then multiplied by $A_{E1}$ the known original amplitude of the embedded subcarrier which was predefined and fixed at the transmitter and is also known at the receiver. Similarly $X_2$, is also divided by $Z_1$ and is also multiplied by $A_{E1}$. Thus, performing these operations results in $$\frac{X_1}{Z_1} A_{E1} = \frac{A_1 e^{j(\phi_1+\theta_E)} H}{A_{E1} e^{j\theta_{E1}} H} \times A_{E1} = A_1 e^{j\phi_1} = I_1 + jQ_1 = S_1 \quad (17)$$

$$\frac{X_2}{Z_1} A_{E1} = \frac{A_2 e^{j(\phi_2+\theta_E)} H}{A_{E1} e^{j\theta_{E1}} H} \times A_{E1} = A_2 e^{j\phi_2} = I_2 + jQ_2 = S_2 \quad (18)$$

It can be seen that the original data ready to be transmitted on the same subcarrier over sequential frames in conventional OFDM frame has been recovered with the effects of the fast fading multipath channel completely removed. A further advantage of this technique is that the original data has been recovered without the receiver having any knowledge on the nature of the embedded subcarrier apart from its fixed amplitude on an I-Q constellation plot.

In most receivers, the I and Q values derived in equations (17) and (18) are measured values for each constellation bit pattern. If noise is present, then these become "estimates" of the original transmitted values and are denoted by $\hat{I}_1$, $\hat{Q}_1$, $\hat{I}_2$, $\hat{Q}_2$. It is easy to show from (17) and (18) that the estimated values for I and Q can be determined from the measured values $I_{X1}$, $Q_{X1}$, $I_{Z1}$, $Q_{Z1}$, $I_{X2}$, $Q_{X2}$ at the receiver through the following decoding algorithms $$\hat{I}_1 = A_{E1} \left[ \frac{I_{X1} I_{Z1} + Q_{X1} Q_{Z1}}{I_{Z1}^2 + Q_{Z1}^2} \right] \quad (19)$$

$$\hat{Q}_1 = A_{E1} \left[ \frac{I_{Z1} Q_{X1} + I_{X1} Q_{Z1}}{I_{Z1}^2 + Q_{Z1}^2} \right] \quad (20)$$

$$\hat{A}_1 = \sqrt{(\hat{I}_1^2 + \hat{Q}_1^2)} \quad (21)$$

$$\hat{\phi}_1 = \tan^{-1}\left(\frac{\hat{Q}_1}{\hat{I}_1}\right) \quad (22)$$

$$\hat{I}_2 = A_{E1} \left[ \frac{I_{X2} I_{Z1} + Q_{X2} Q_{Z1}}{I_{Z1}^2 + Q_{Z1}^2} \right] \quad (23)$$

$$\hat{Q}_2 = A_{E1} \left[ \frac{I_{Z1} Q_{X2} + I_{X2} Q_{Z1}}{I_{Z1}^2 + Q_{Z1}^2} \right] \quad (24)$$

$$\hat{A}_2 = \sqrt{(\hat{I}_2^2 + \hat{Q}_2^2)} \quad (25)$$

$$\hat{\phi}_2 = \tan^{-1}\left(\frac{\hat{Q}_2}{\hat{I}_2}\right) \quad (26)$$

If required, the channel occurring during the transmission of $D_1$ denoted by $H_{D1}$, may be estimated through $$\hat{H}_{D1} = \frac{(I_{X1} \cos(\hat{\phi}_1 + \hat{\theta}_1) + Q_{X1} \sin(\hat{\phi}_1 + \hat{\theta}_1))}{A_{E1}} + \quad (27)$$

$$j\frac{(Q_{X1} \cos(\hat{\phi}_1 + \hat{\theta}_1) - I_{X1} \sin(\hat{\phi}_1 + \hat{\theta}_1))}{A_{E1}}.$$

Note that $\hat{\theta}_1 = \hat{\theta}_1(\hat{\phi}_1, \hat{\phi}_2)$ thus it is always known based on knowledge of the estimated values $\hat{\phi}_1$ and $\hat{\phi}_2$ from (22) and (26). Similarly, the channel occurring during the transmission of the embedded subcarrier $E_1$ denoted by $H_{E1}$, may be estimated through $$\hat{H}_{E1} = \frac{(I_{Z1}\cos\hat{\theta}_1 + Q_{Z1}\sin\hat{\theta}_1)}{A_{E1}} + j\frac{(Q_{Z1}\cos\hat{\theta}_1 - I_{Z1}\sin\hat{\theta}_1)}{A_{E1}} \quad (28)$$

The channel occurring during transmission of $D_2$ denoted by $H_{D2}$, may be estimated through $$\hat{H}_{D2} = \frac{(I_{X2}\cos(\hat{\phi}_2 + \hat{\theta}_1) + Q_{X2}\sin(\hat{\phi}_2 + \hat{\theta}_1))}{A_{E1}} + \quad (29)$$

$$j\frac{(Q_{X2}\cos(\hat{\phi}_2 + \hat{\theta}_1) - I_{X2}\sin(\hat{\phi}_2 + \hat{\theta}_1))}{A_{E1}}$$

If the channel does not vary significantly across the subcarrier Group then all three estimates of the channel will be the same, i.e.

$$\hat{H}_{D1} = \hat{H}_{E1} = \hat{H}_{D2} = \hat{H}. \quad (30)$$

It is possible to choose the value of $\phi_1$ to be a constant and therefore known at the receiver, or it may be a derived as a function of the convoluted data through the general formula:

$$\hat{\theta}_1 = (\hat{\phi}_1 + \hat{\phi}_2)$$

$$\hat{\theta}_1 = (\hat{\phi}_1 + \hat{\phi}_2) \quad (31)$$

$$\hat{\theta}_1 = -(\hat{\phi}_1 + \hat{\phi}_2) \quad (32)$$

$$\hat{\theta}_1 = -(\hat{\phi}_1 + \hat{\phi}_2)/2 \quad (33)$$

When other implementations are given, i.e. 3:1, 4:1 ECM the convoluted phase angles can take many forms, the general form being:

$$\theta_{E1} = (\alpha_1\phi_1 + \alpha_2\phi_2 + \ldots \alpha_N\phi_N) = \sum_{n=1}^{N}\alpha_n\phi_n$$

with the modified phases given by $$\varphi_{Dn}(\beta_n\varphi_n + \theta_{E1})$$

The values $\alpha_n$, $\beta_n$ are appropriate coefficient multipliers of the phase angles associated with the embedded and modified phases respectively. The simplest implementation uses $\alpha_n = \alpha$, and $\beta_n = \beta$ but the choice of coefficients can be from a predefined series or simply set to appropriate constant values.

Figure 2:
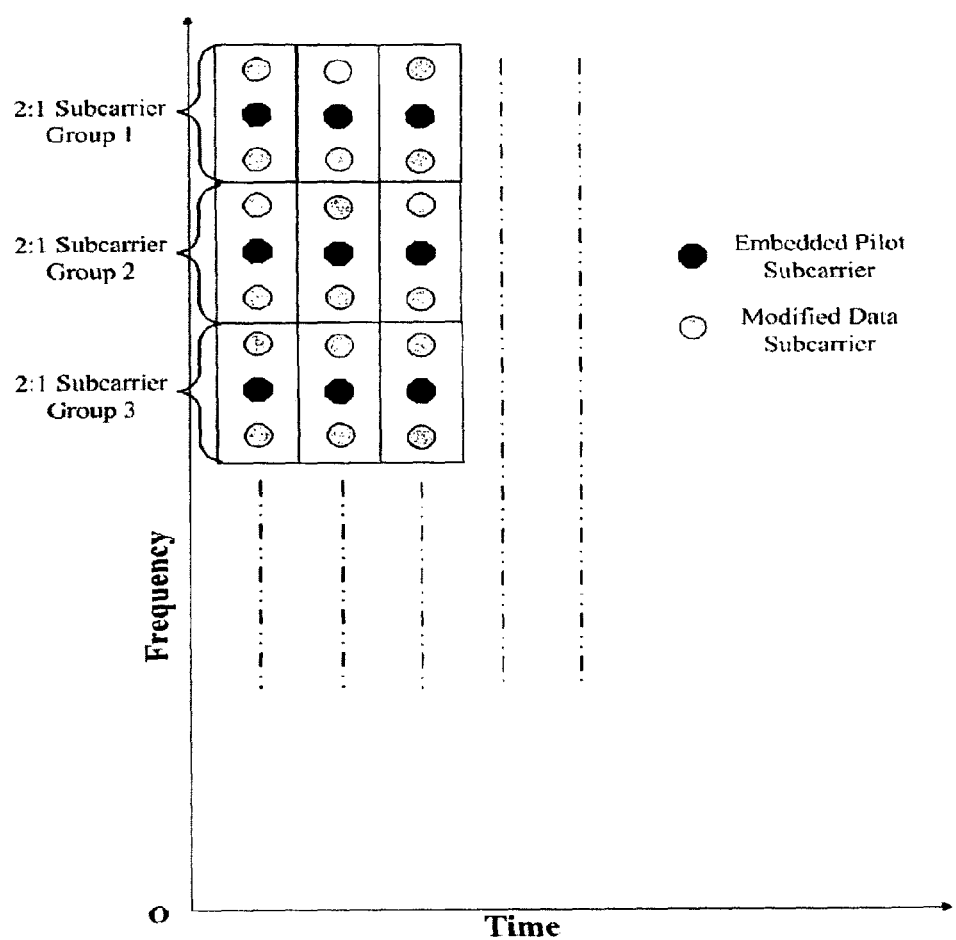
FIG. 2 is a frequency time domain subcarrier map for 2:1 intra-frame ECM.

FIG. 2 shows a frequency time domain subcarrier map for 2:1 intra-frame ECM. In this, the convolution takes place (a) intrinsically within each frame between frequency subcarriers within the same frame, or (b) across frames i.e. simultaneously internally within the same frame and across adjacent or near frames, i.e. inter-intra-frame.

(a) Intra-Frame Convolution Modulation Clusters

For intra-frame convolution, the subcarriers within each frame are firstly segmented into groups of two frequency subcarriers. For example, in the first OFDM frame to be transmitted the segmentation is as follows:

$$S = \begin{bmatrix} \begin{bmatrix} S_1 \\ S_2 \end{bmatrix} \\ \begin{bmatrix} S_3 \\ S_4 \end{bmatrix} \\ \vdots \end{bmatrix}$$

where $S_1$, $S_2$ ... represent the modulated data on each subcarrier. The embedded subcarrier E is inserted in the middle of the two data subcarriers to form a cluster group of three subcarriers and the phase of each of the two original subcarriers on either side of the embedded subcarrier is modified by the addition of the embedded subcarrier phase θ. The phase choice for θ is the same as for the convolution as described in WO2004/084513. The frequency time domain map for this arrangement is shown in FIG. 2, for a subcarrier map for 2:1 intra-frame ECM. The resulting transmission frame becomes:

$$S_{ECM} = \begin{bmatrix} \begin{bmatrix} D_1 \\ E_1 \\ D_2 \end{bmatrix} \\ \begin{bmatrix} D_3 \\ E_2 \\ D_4 \end{bmatrix} \\ \vdots \end{bmatrix} = \begin{bmatrix} \begin{bmatrix} A_1 e^{j(\phi_1 + \theta_1)} \\ A_{E1} e^{j(\theta_1)} \\ A_2 e^{j(\phi_2 + \theta_1)} \end{bmatrix} \\ \begin{bmatrix} A_3 e^{j(\phi_3 + \theta_2)} \\ A_{E2} e^{j(\theta_2)} \\ A_4 e^{j(\phi_4 + \theta_2)} \end{bmatrix} \\ \vdots \end{bmatrix}$$

Here the embedded transmission pilots can be considered individual embedded subcarriers within a block of subcarriers.

When each subcarrier is affected by multichannel affects, the received signal is of the form $$S'_{ECM} = \begin{bmatrix} \begin{bmatrix} \hat{D}_1 \\ \hat{E}_1 \\ \hat{D}_2 \end{bmatrix} \\ \begin{bmatrix} \hat{D}_3 \\ \hat{E}_2 \\ \hat{D}_4 \end{bmatrix} \\ \vdots \end{bmatrix} = \begin{bmatrix} \begin{bmatrix} A_1 e^{j(\phi_1 + \theta_1)} H_1 \\ A_{E1} e^{j(\theta_1)} H_{E1} \\ A_2 e^{j(\phi_2 + \theta_1)} H_2 \end{bmatrix} \\ \begin{bmatrix} A_3 e^{j(\phi_3 + \theta_2)} H_3 \\ A_{E2} e^{j(\theta_2)} H_{E2} \\ A_4 e^{j(\phi_4 + \theta_2)} H_4 \end{bmatrix} \\ \vdots \end{bmatrix}$$

Assuming that the channel does not vary much between each adjacent subcarrier, i.e.

$$H_1 = H_{E1} = H_2; H_3 = H_{E2} = H_4 \text{ etc.}$$

then, dividing in each cluster, the received subcarrier signal by the received pilot, results in:

$$\hat{S} = \begin{bmatrix} \frac{\hat{D}_1}{\hat{E}_1} \\ \frac{\hat{D}_2}{\hat{E}_1} \\ \frac{\hat{D}_3}{\hat{E}_2} \\ \frac{\hat{D}_4}{\hat{E}_2} \\ \vdots \end{bmatrix} = \begin{bmatrix} A_1 e^{j\phi_1} \\ A_2 e^{j\phi_2} \\ A_3 e^{j\phi_3} \\ A_4 e^{j\phi_4} \\ \vdots \end{bmatrix}$$

It can be seen that division of the received signals by the embedded pilot results in the original data being recovered with the channel now being eliminated. The algorithms are those outlined in WO2004/084513. The accuracy of the recovery depends on two factors, namely the noise present as well as the channel conditions.

Within an intra-frame ECM construction, each frame consists of a number of clusters with embedded pilots. Take for example an OFDM frame with N intra-frame ECM clusters where each cluster may have one ECM embedded pilot. All subcarriers within an individual cluster can be adjusted by the addition of the same phase offset, without affecting the recovery of the data. For example, in the simplest 2:1 ECM as described above, if each cluster is given an arbitrary phase shift, then the decoding still provides the recovered data. Letting the phase adjustment of each cluster be denoted by d then $$S_{ECM} = \begin{bmatrix} \begin{bmatrix} D_1 \\ E_1 \\ D_2 \end{bmatrix} \\ \begin{bmatrix} D_3 \\ E_2 \\ D_4 \end{bmatrix} \\ \vdots \end{bmatrix} = \begin{bmatrix} \begin{bmatrix} A_1 e^{j(\phi_1+\theta_1+d_1)} \\ A_{E1} e^{j(\theta_1+d_1)} \\ A_2 e^{j(\phi_2+\theta_1+d_1)} \end{bmatrix} \\ \begin{bmatrix} A_3 e^{j(\phi_3+\theta_2+d_2)} \\ A_{E2} e^{j(\theta_2+d_2)} \\ A_4 e^{j(\phi_4+\theta_2+d_2)} \end{bmatrix} \\ \vdots \end{bmatrix}$$

Once the channel has been included, and assuming as above, that the channel variations between subcarriers do not change significantly, then it is clear that applying the ECM decoding produces the same results as previously described. This is a significant outcome as the receiver is now transparent in relation to individual cluster phase shifts. There are no overheads to be transmitted to indicate that phase shifts have occurred. Thus, each cluster can be independently phase shifted in some way, so that the resulting PAPR of the frame may be reduced, all of which does not require to be known by the receiver. It is therefore possible to provide numerous methods of optimising the PAPR of each frame through cluster phasing techniques without the receiver requiring knowledge of the technique.

Examples of reducing PAPR may include phase shifting clusters with random values of d. Also, a number of random phasing processes could be used on the same frame, e.g. eight processes, and the frame the phasing process provides with the lowest PAPR could be transmitter. This is similar in some ways to SLM (Selected Mapping) but in this case the process is transparent to the receiver. Equally, a sequential phasing system process could be applied to each frame, through optimised cluster phasing.

Figure 3:
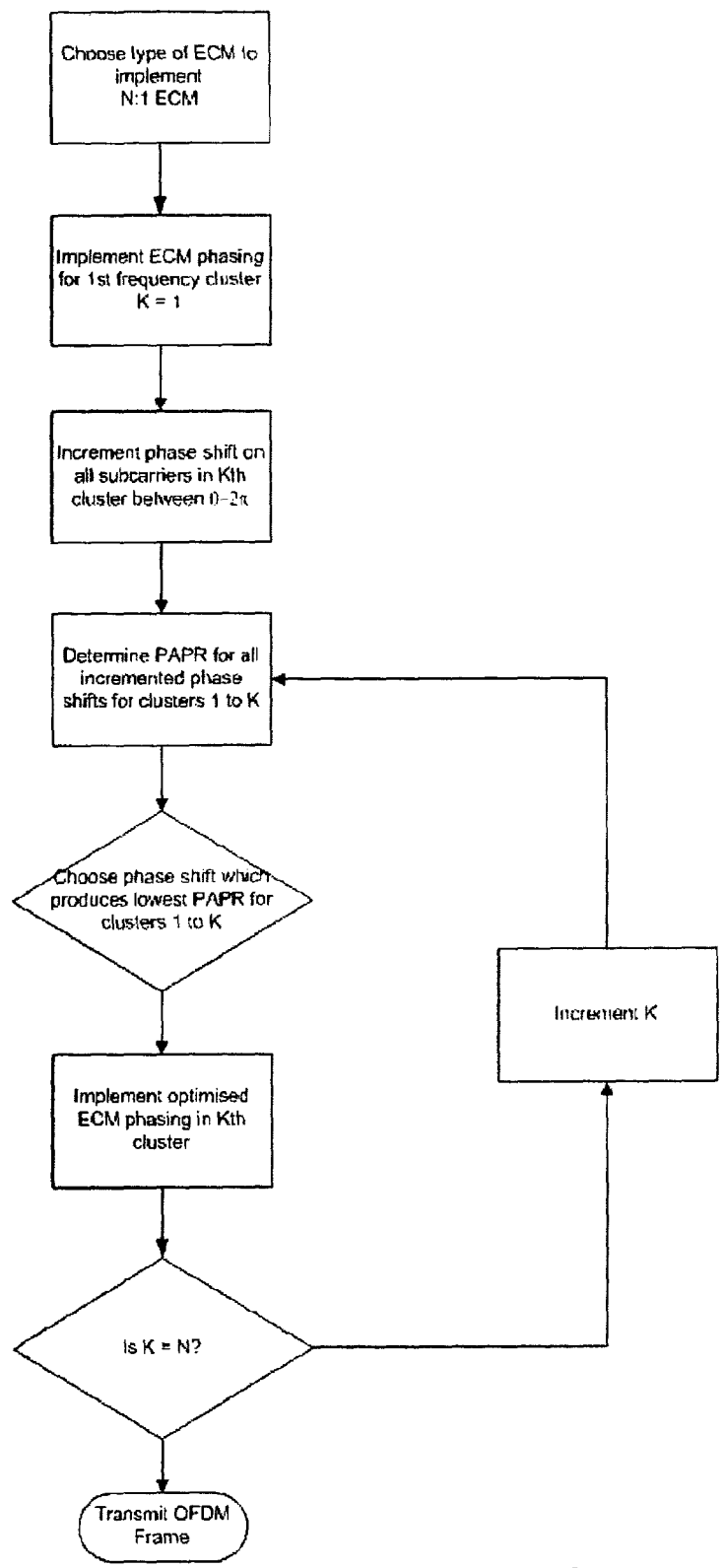
FIG. 3 is a flow diagram of a PAPR optimisation process.

FIG. 3 shows a PAPR optimisation process. In a first step, the type of ECM to implement is chosen. Any of the ECM techniques described in WO2004/084513 could be used. ECM phasing is then implemented for the first frequency cluster, K=1. The phase shift on all sub carriers in the case cluster is implemented between 0-2π. Then the PAPR is determined for all implemented phase shifts for clusters 1-K. After this, the phase shift that produces the lowest PAPR for clusters 1-K is selected. This phase shift is then used in the ECM phasing in the case cluster, thereby optimising PAPR performance. This is done for every cluster up to the end cluster. Once this is completed for every cluster the OSTM frame is transmitted.

Figure 4:
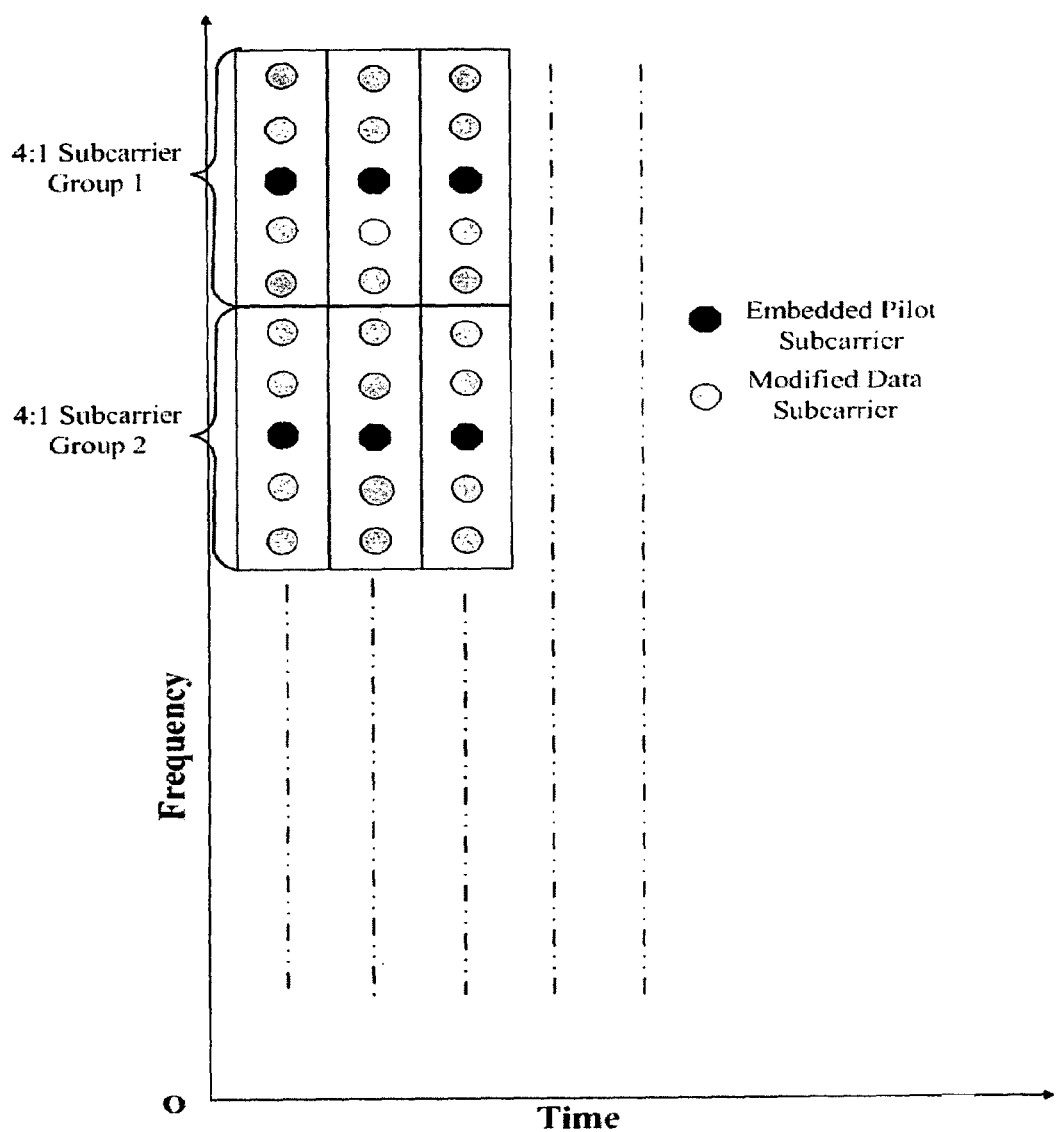
FIG. 4 is a frequency time domain subcarrier map for 4:1 intra frame ECM.
Figure 5:
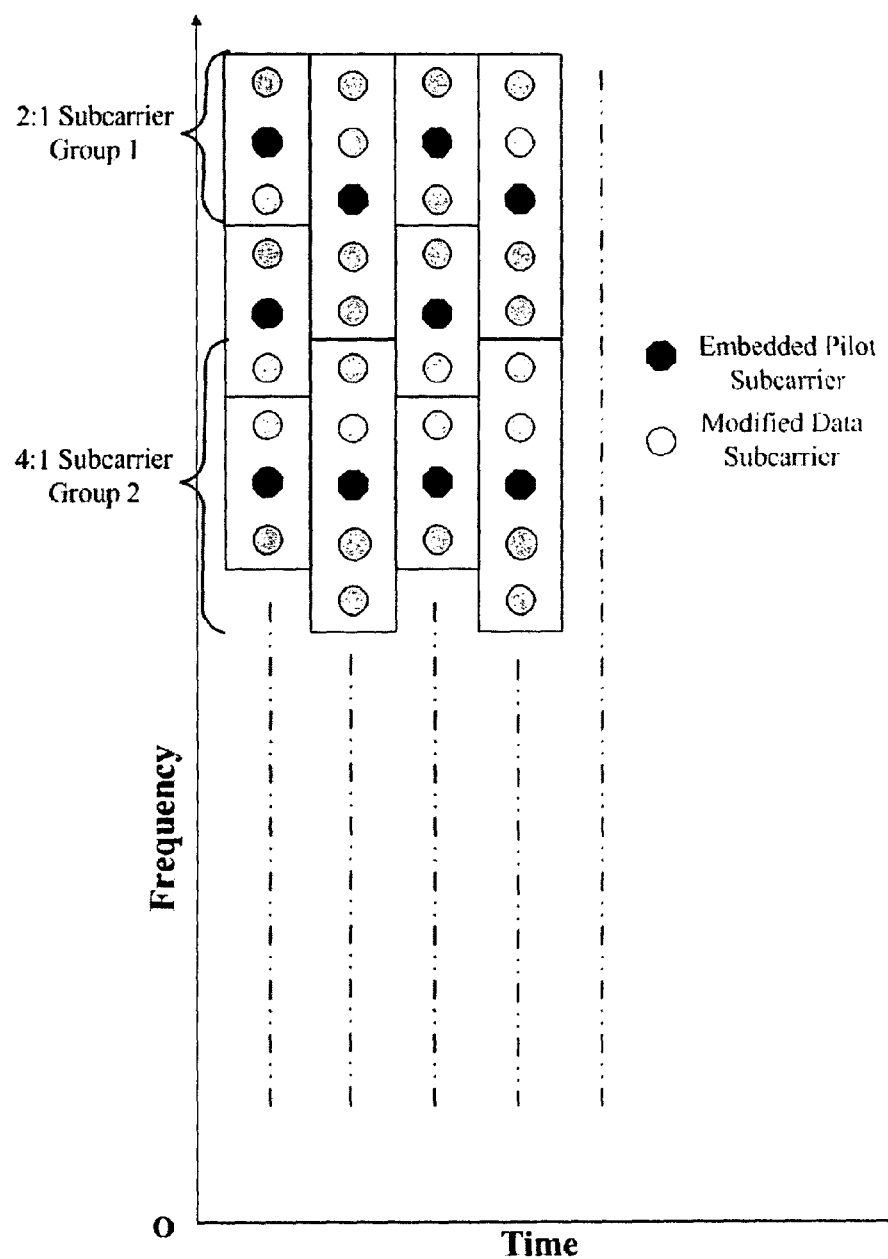
FIG. 5 is a frequency time domain subcarrier map showing different consecutive intra-frame ECM implementations.

Intra-frame ECM may be extended to larger subcarrier groupings, i.e. N:1 ECM. FIG. 4 demonstrates the location of pilots and modified subcarriers for 4:1 ECM. The embedded ECM pilot need not lie in the middle of the cluster group. For example, in 3:1 ECM the ECM pilot within each cluster group may reside in the first, second, third or fourth subcarrier cluster group location. If required consecutive frame transmissions can also employ different ECM arrangements. For example, FIG. 5 shows consecutive odd and even frame transmissions employing 2:1 ECM and 4:1 ECM respectively.

Depending on the severity of the multi-path fading, different forms of ECM can be implemented. Clearly 2:1 ECM will be superior to 3:1, or 4:1 etc., and these may be changed appropriately dependent on channel and signal-to-noise conditions.

(b) Inter-Intra-Frame Convolution Modulation Clusters

Figure 6:
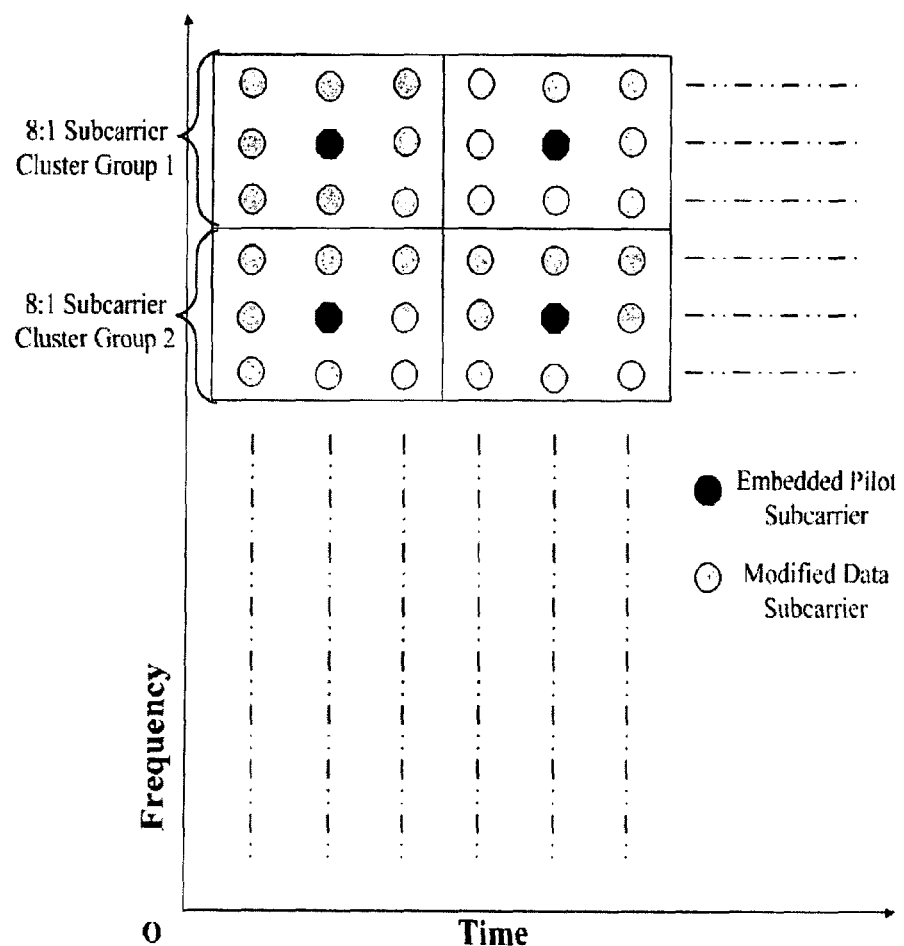
FIG. 6 is a frequency time domain subcarrier map showing inter-intra frame ECM clustering.

The principles described above can be applied to different cluster arrangements of subcarriers across consecutively transmitted frames. As an example, consider the nine subcarrier cluster groupings, which occur across three consecutively transmitted frames in FIG. 6. The embedded ECM pilots are positioned in the centre of the clusters, with the modified data subcarriers surrounding the embedded pilot.

Figure 7:
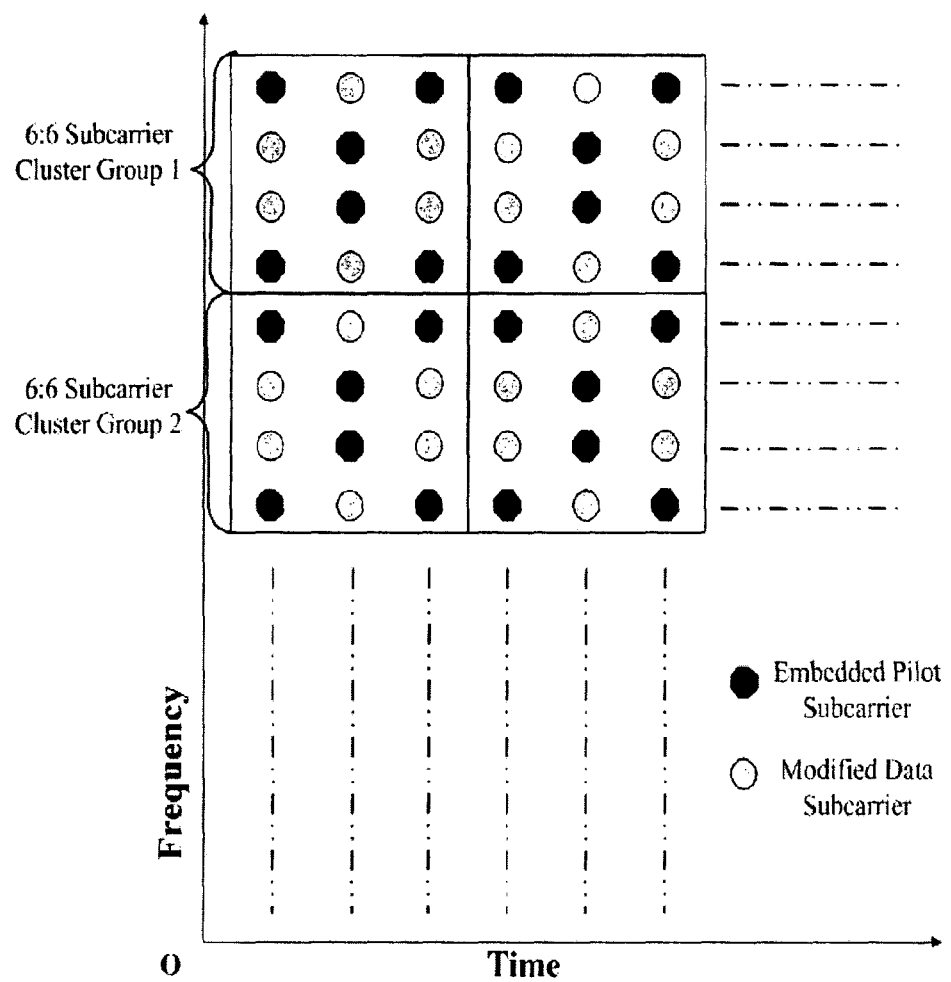
FIG. 7 is a frequency time domain subcarrier map showing inter-intra frame ECM clustering with more embedded pilots.

A problem with this implementation is that the channel variations may have changed significantly between frames thus reducing the effectiveness of ECM in channel elimination. However, it is possible to reorganise the pilots to form a different more optimised or preferred implementation. Thus, any form of m frame by n subcarrier clustering may be chosen, with the p embedded pilots suitably chosen within the cluster. In addition, different clustering groups may be chosen across the frame transmissions. As an example, a 3 frame×4 subcarrier cluster with 6 embedded pilots to provide a 6:6 ECM cluster group as shown in FIG. 7.

ECM can be employed in a different intra-frame structure by embedding the same pilot more than once within the cluster. Application of embedded interpolation techniques across each cluster provides channel correction. Further phase shifting individual clusters within each frame will also provide simultaneous reduction in PAPR which again is transparent to the receiver i.e. no overheads are required to be transmitted for decoding. For example, consider FIG. 8 where two identical ECM embedded pilots are employed in each of the 4:2 ECM clusters. In each cluster, the transmitted signals are represented by $$S = \begin{bmatrix} D_1 \\ E_1 \\ D_2 \\ D_3 \\ E_2 \\ D_4 \end{bmatrix} = \begin{bmatrix} A_1 e^{j(\phi_1+\theta)} \\ A_E e^{j(\theta)} \\ A_2 e^{j(\phi_2+\theta)} \\ A_3 e^{j(\phi_3+\theta)} \\ A_E e^{j(\theta)} \\ A_4 e^{j(\phi_4+\theta)} \end{bmatrix}$$

It is best to demonstrate the decoding implementation and associated advantages of channel elimination and reduced PAPR methods with reference to a particular example. The application of this can be adopted within any wireless or broadband frame architectures e.g. all IEEE802.11x, IEEE802.16x standards, and future wireless xDSL standards. As an example, consider the mobile WiMax clustering (WiMax IEEE802.16e standard.)

Figure 8:
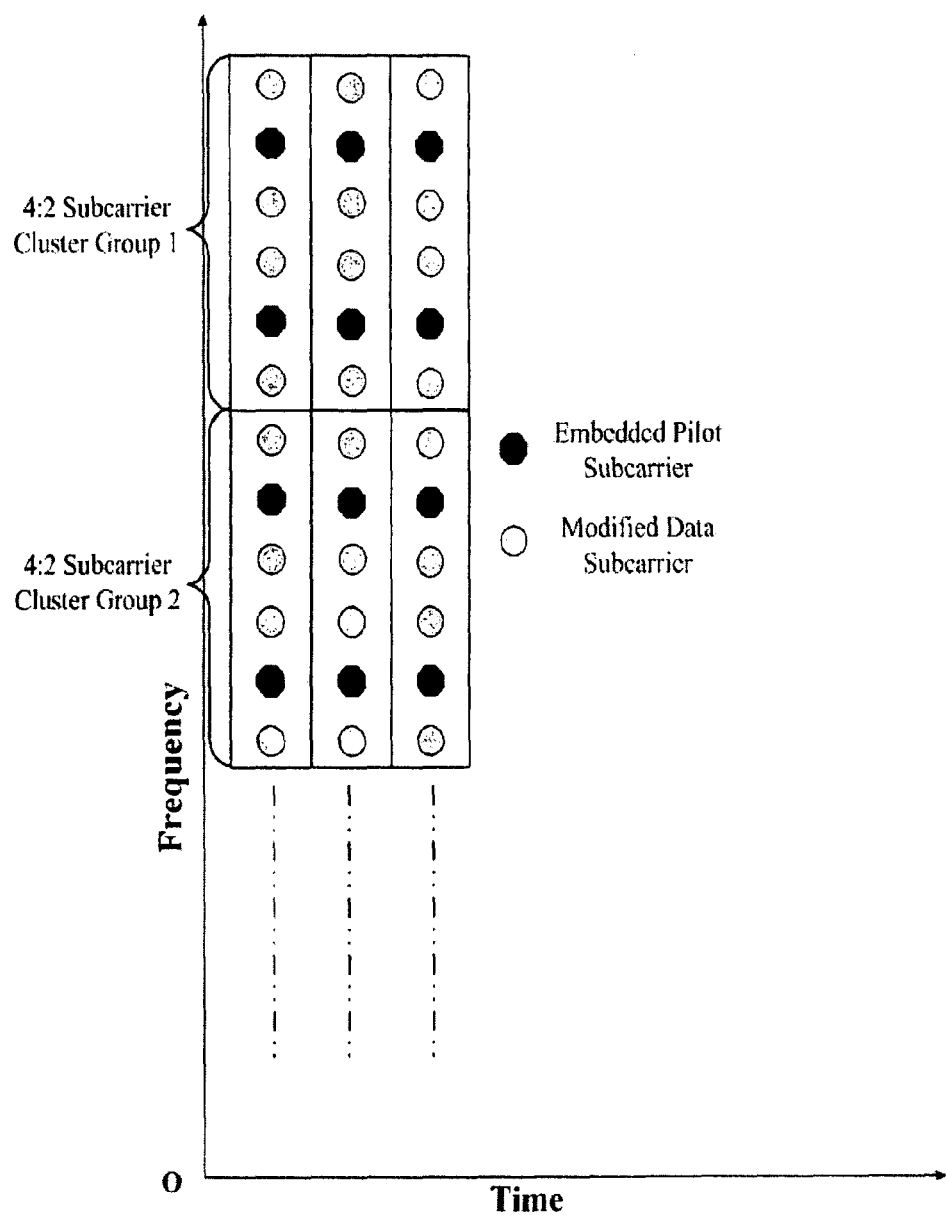
FIG. 8 shows placement of the same embedded pilot in more than one location within an intra-frame cluster.
Figure 9:
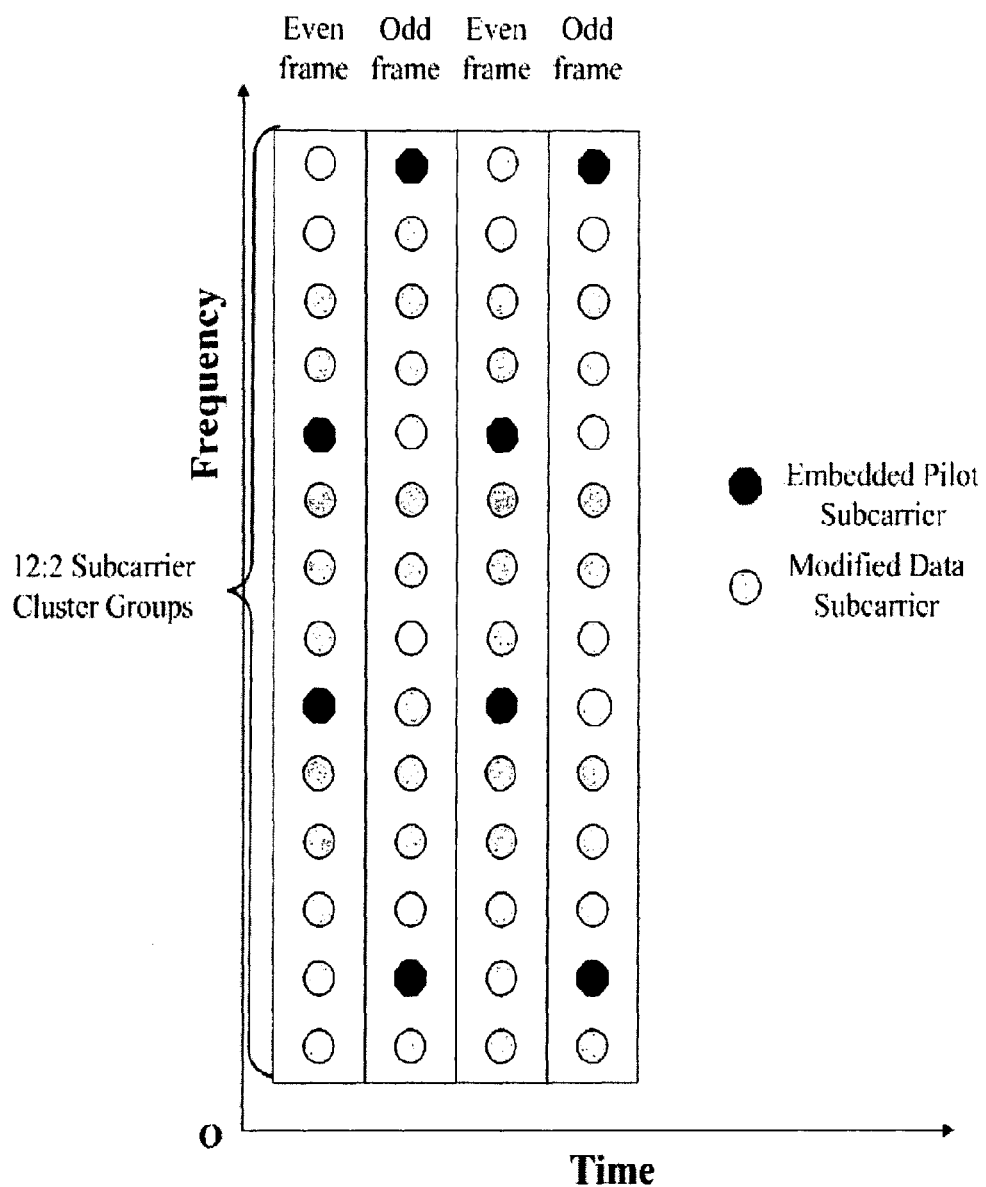
FIG. 9 shows an example of the same embedded pilot located within the standard mobile WiMax pilot down link clusters.

Each of the OFDMA clusters employed transmitted from a base station comprises even and odd frame structures. ECM can be implemented exactly within the same structures, noting that the two constructed ECM pilot subcarriers in each cluster are the same based on the data being carried within each cluster, as shown in FIG. 8. It is easy to show that the ECM information being carried for example in the even cluster is given by $$S_{ECM\_even} = \begin{bmatrix} D_1 \\ D_2 \\ D_3 \\ D_4 \\ E_1 \\ D_5 \\ D_6 \\ D_7 \\ D_8 \\ E_2 \\ D_9 \\ D_{10} \\ D_{11} \\ D_{12} \end{bmatrix} = \begin{bmatrix} A_1 e^{j(\phi_1+\theta)} \\ A_2 e^{j(\phi_2+\theta)} \\ A_3 e^{j(\phi_3+\theta)} \\ A_4 e^{j(\phi_4+\theta)} \\ A_E e^{j(\theta)} \\ A_5 e^{j(\phi_5+\theta)} \\ A_6 e^{j(\phi_6+\theta)} \\ A_7 e^{j(\phi_7+\theta)} \\ A_8 e^{j(\phi_8+\theta)} \\ A_E e^{j(\theta)} \\ A_9 e^{j(\phi_9+\theta)} \\ A_{10} e^{j(\phi_{10}+\theta)} \\ A_{11} e^{j(\phi_{11}+\theta)} \\ A_{12} e^{j(\phi_{12}+\theta)} \end{bmatrix}$$

A similar construction may be evaluated for the odd clusters where the pilots are located on different subcarriers. On reception of the even frame, each subcarrier will be affected differently by the rapidly varying multi-path channel, defined by $H_n$, to produce $$\hat{S}_{ECM\_even} = \begin{bmatrix} \hat{D}_1 \\ \hat{D}_2 \\ \hat{D}_3 \\ \hat{D}_4 \\ \hat{E}_1 \\ \hat{D}_5 \\ \hat{D}_6 \\ \hat{D}_7 \\ \hat{D}_8 \\ \hat{E}_2 \\ \hat{D}_9 \\ \hat{D}_{10} \\ \hat{D}_{11} \\ \hat{D}_{12} \end{bmatrix} = \begin{bmatrix} A_1 e^{j(\phi_1+\theta)} H_1 \\ A_2 e^{j(\phi_2+\theta)} H_2 \\ A_3 e^{j(\phi_3+\theta)} H_3 \\ A_4 e^{j(\phi_4+\theta)} H_4 \\ A_E e^{j(\theta)} H_{E1} \\ A_5 e^{j(\phi_5+\theta)} H_5 \\ A_6 e^{j(\phi_6+\theta)} H_6 \\ A_7 e^{j(\phi_7+\theta)} H_7 \\ A_8 e^{j(\phi_8+\theta)} H_8 \\ A_E e^{j(\theta)} H_{E2} \\ A_9 e^{j(\phi_9+\theta)} H_9 \\ A_{10} e^{j(\phi_{10}+\theta)} H_{10} \\ A_{11} e^{j(\phi_{11}+\theta)} H_{11} \\ A_{12} e^{j(\phi_{12}+\theta)} H_{12} \end{bmatrix}$$

Assuming that $E_2$ is the reference embedded pilot, then firstly, the ECM decoding algorithm is applied to all subcarriers using $E_2$, i.e.

$$\hat{S}_{decode\_ECM\_even} = \begin{bmatrix} \dfrac{\hat{D}_1}{\hat{E}_2} \\ \dfrac{\hat{D}_2}{\hat{E}_2} \\ \dfrac{\hat{D}_3}{\hat{E}_2} \\ \dfrac{\hat{D}_4}{\hat{E}_2} \\ \dfrac{\hat{E}_1}{\hat{E}_2} \\ \dfrac{\hat{D}_5}{\hat{E}_2} \\ \dfrac{\hat{D}_6}{\hat{E}_2} \\ \dfrac{\hat{D}_7}{\hat{E}_2} \\ \dfrac{\hat{D}_8}{\hat{E}_2} \\ \dfrac{\hat{E}_2}{\hat{E}_2} \\ \dfrac{\hat{D}_9}{\hat{E}_2} \\ \dfrac{\hat{D}_{10}}{\hat{E}_2} \\ \dfrac{\hat{D}_{11}}{\hat{E}_2} \\ \dfrac{\hat{D}_{12}}{\hat{E}_2} \end{bmatrix} = \begin{bmatrix} \dfrac{A_1}{A_E} e^{j(\phi_1)} \dfrac{H_1}{H_{E2}} \\ \dfrac{A_2}{A_E} e^{j(\phi_2)} \dfrac{H_2}{H_{E2}} \\ \dfrac{A_3}{A_E} e^{j(\phi_3)} \dfrac{H_3}{H_{E2}} \\ \dfrac{A_4}{A_E} e^{j(\phi_4+\theta)} \dfrac{H_4}{H_{E2}} \\ \dfrac{H_{E1}}{H_{E2}} \\ \dfrac{A_5}{A_E} e^{j(\phi_5)} \dfrac{H_5}{H_{E2}} \\ \dfrac{A_6}{A_E} e^{j(\phi_6)} \dfrac{H_6}{H_{E2}} \\ \dfrac{A_7}{A_E} e^{j(\phi_7)} \dfrac{H_7}{H_{E2}} \\ \dfrac{A_8}{A_E} e^{j(\phi_8)} \dfrac{H_8}{H_{E2}} \\ 1 \\ \dfrac{A_9}{A_E} e^{j(\phi_9+\theta)} \dfrac{H_9}{H_{E2}} \\ \dfrac{A_{10}}{A_E} e^{j(\phi_{10})} \dfrac{H_{10}}{H_{E2}} \\ \dfrac{A_{11}}{A_E} e^{j(\phi_{11}+\theta)} \dfrac{H_{11}}{H_{E2}} \\ \dfrac{A_{12}}{A_E} e^{j(\phi_{12}+\theta)} \dfrac{H_{12}}{H_{E2}} \end{bmatrix} =$$

$$\begin{bmatrix} \dfrac{A_1}{A_E} e^{j(\phi_1)} R_1 \\ \dfrac{A_2}{A_E} e^{j(\phi_2)} R_2 \\ \dfrac{A_3}{A_E} e^{j(\phi_3)} R_3 \\ \dfrac{A_4}{A_E} e^{j(\phi_4)} R_4 \\ R_{E1} \\ \dfrac{A_5}{A_E} e^{j(\phi_5)} R_5 \\ \dfrac{A_6}{A_E} e^{j(\phi_6)} R_6 \end{bmatrix}$$

-continued $$\begin{bmatrix} \frac{A_7}{A_E} e^{j(\phi_7)} & R_7 \\ \frac{A_8}{A_E} e^{j(\phi_8)} & R_8 \\ & 1 \\ \frac{A_9}{A_E} e^{j(\phi_9)} & R_9 \\ \frac{A_{10}}{A_E} e^{j(\phi_{10})} & R_{10} \\ \frac{A_{11}}{A_E} e^{j(\phi_{11})} & R_{11} \\ \frac{A_{12}}{A_E} e^{j(\phi_{12})} & R_{12} \end{bmatrix}$$

Because $E_1$ and $E_2$ are the same in the transmitted signal the ratio $E_1/E_2$ in the received signal provides a relative measure of the channel distortion. Using the determined values between the ECM embedded pilots in subcarriers 5 and 9, it is possible to construct an interpolation to estimate the appropriate values of $R_1$ to $R_{12}$. For example, for linear interpolation, i.e.

$$\hat{R}_x = m \cdot x + c$$

the gradient is calculated through $$m = \frac{(1 - R_{E1})}{(9 - 5)} = \frac{(1 - R_{E1})}{4}$$

whilst the intercept with the x axis is determined through:

$$c = 5 - m$$

Though linear interpolation has been applied other forms of interpolation may be employed.

Multipath channel corrections are made by dividing the decoded data by the estimated values of R. Once the corrections have been made, the transmitted data may be recovered at the receiver through multiplication of the corrected data by $A_E$. Thus the recovered constellation point data, ready for constellation diagram decoding is obtained through:

$$\hat{S}_{even} = \begin{bmatrix} \hat{S}_1 \\ \hat{S}_2 \\ \hat{S}_3 \\ \hat{S}_4 \\ \hat{S}_5 \\ \hat{S}_6 \\ \hat{S}_7 \\ \hat{S}_8 \\ \hat{S}_9 \\ \hat{S}_{10} \\ \hat{S}_{11} \\ \hat{S}_{12} \end{bmatrix} = \begin{bmatrix} \left(\frac{\hat{D}_2}{\hat{E}_2} \frac{A_E}{\hat{R}_1}\right) \\ \left(\frac{\hat{D}_3}{\hat{E}_2} \frac{A_E}{\hat{R}_2}\right) \\ \left(\frac{\hat{D}_4}{\hat{E}_2} \frac{A_E}{\hat{R}_3}\right) \\ \left(\frac{\hat{E}_1}{\hat{E}_2} \frac{A_E}{\hat{R}_4}\right) \\ \left(\frac{\hat{D}_5}{\hat{E}_2} \frac{A_E}{\hat{R}_5}\right) \\ \left(\frac{\hat{D}_6}{\hat{E}_2} \frac{A_E}{\hat{R}_6}\right) \\ \left(\frac{\hat{D}_7}{\hat{E}_2} \frac{A_E}{\hat{R}_7}\right) \\ \left(\frac{\hat{D}_8}{\hat{E}_2} \frac{A_E}{\hat{R}_8}\right) \\ \left(\frac{\hat{E}_2}{\hat{E}_2} \frac{A_E}{\hat{R}_9}\right) \\ \left(\frac{\hat{D}_9}{\hat{E}_2} \frac{A_E}{\hat{R}_{10}}\right) \\ \left(\frac{\hat{D}_{10}}{\hat{E}_2} \frac{A_E}{\hat{R}_{11}}\right) \\ \left(\frac{\hat{D}_{11}}{\hat{E}_2} \frac{A_E}{\hat{R}_{12}}\right) \end{bmatrix}$$

As will be appreciated, the same results can be obtained by ECM decoding using $E_1$ rather than $E_2$. In addition, the same processes can be applied to the odd frames to recover the odd frame data.

In the WiMax situation outlined above, each of the OFDMA cluster groupings in a transmission can be treated independently in terms of ECM. For example, hundreds of standard channel clusters may be transmitted in every frame. The advantage of ECM is that a different phase shift d can be added to each different cluster within each frame. This allows the PAPR to be reduced again with the receiver not requiring knowledge of d within each cluster. Optimisation processes for the PAPR may then be employed as discussed previously through arbitrary or strategic phase additions to each cluster with each frame.

The methods or variations of them outlined above may also be extended to the combined inter-intra frame cluster grouping so that a combination of phasing methods and channel interpolation methods could be adopted to reduce multipath fading issues and simultaneously reduce the PAPR within each frame Extension of the above ideas can be carried through to multiple identical pilots embedded across the time-frequency subcarriers within the clusters, i.e. the embedded pilot phasing is the same and is a function of all the data phases within the cluster. In this scenario other channel estimation techniques could also be employed including $2^{nd}$ order linear interpolation, polynomial interpolation, minimum mean square error (MMSE) etc.

The embedded ECM pilots in all the above applications may also employ specialised phasing sequences within frames or clusters. Specialised phasing sequences, which possess good cyclic autocorrelation and self-correlation properties are often used for synchronisation, or to separate, distinguish or mitigate interfering signals. Typically, employed sequences include PN sequences, Zadoff-Chu sequences etc. Appropriate phase shifts related to these sequences can be applied to the embedded pilots at the transmitter to make the pilots follow the desired sequence. The same phasing sequence can be applied to the received pilots to correct for the phasing thus allowing the above processes to be carried out for channel estimation and correction of the data. The transmitted pilots, because they still have the inherent good correlation properties, can still be used for signal interference mitigation and other functions such as synchronisation and ranging as well as maintaining lower PAPR. As an example, let $\mu$ be the specialised sequence pilot phase required to be associated with the embedded pilot. To obtain $\mu$, the ECM pilot phase $\theta$ is corrected by $\epsilon$ such that $\mu = \theta + \epsilon$. Each subcarrier in the entire frame is also adjusted by $\epsilon$ so that $\mu$ now exists in the phase of each transmitted subcarrier. The resulting transmission therefore maintains the special phase sequence on the pilots and is still able to decode as described above. The added value of using such sequence pilots is that other more advanced techniques of channel estimation, which rely on the special correlation properties of pilot sequences can also be employed.

The techniques described above can be further employed to provide security of data in the physical layer. As an example consider the following scenario of an ECM subcarrier and also an ECM pilot. The transmitted ECM subcarrier and ECM pilot have the general form:

$$D = A e^{j(\beta\phi + \theta_E)}$$

$$E = A_E e^{j(\theta_E)}$$

where as before $\phi$ is the modulated data phase angle, $\beta$ an appropriate phase scaling factor for the data, A the amplitude of the modulated data, $A_E$ the pilot amplitude, and $\phi_E$ is the embedded ECM pilot phase which is defined as $$\theta_E = (\alpha_1 \phi_1 + \alpha_2 \phi_2 + \ldots \alpha_N \phi_N) = \sum_{n=1}^{N} \alpha_n \phi_n$$

The essence of the encryption process is as follows. It is possible for the transmitter to choose different values $\alpha_n$ for the subcarrier and for the pilot. In this case, the sub-carrier and pilot transmissions can be defined as $$D = A e^{j(\beta\phi + \theta_{ES})}$$

$$E = A_E e^{j(\theta_{EP})}$$

where $$\theta_{ES} = (\alpha_{1S} \phi_1 + \alpha_{2S} \phi_2 + \ldots \alpha_{NS} \phi_N) = \sum_{n=1}^{N} \alpha_{nS} \phi_n$$

and $$\theta_{EP} = (\alpha_{1P} \phi_1 + \alpha_{2P} \phi_2 + \ldots \alpha_{NP} \phi_N) = \sum_{n=1}^{N} \alpha_{nP} \phi_n$$

The values of $\beta$, $\alpha_{nS}$ and $\alpha_{nP}$ are effectively encryption keys. If the transmitter and receiver know these keys, then it is possible to perform ECM decoding and channel elimination as described above. If these keys are not known then it is extremely difficult to decode correctly since a significantly large number of values of the keys may be chosen. The range of keys will depend on the nature of the digital precision of the computational processes. However there may still exist an extremely large combination $\alpha$s and $\beta$s. These encryption keys can be designed from specialised mathematical sequences, formulae or generated randomly as appropriate. Indeed different sequences can be used for different frames to provide further security of data making the information extremely difficult to decode without the keys.

Figure 10:
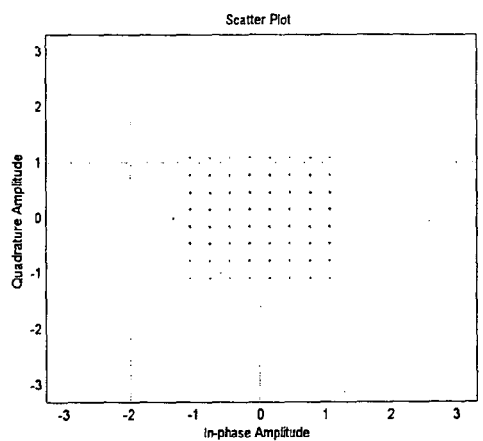
FIG. 10 shows a conventional 64QAM Mobile WiMax transmission and an encrypted 64QAM Mobile WiMax ECM transmission.
Figure 10:
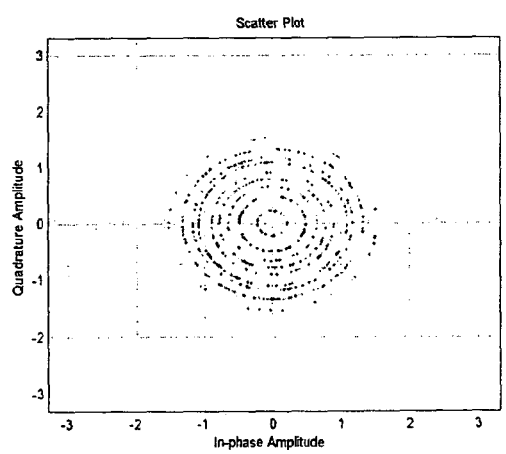

Standard constellation scatter plots showing a conventional 64QAM Mobile WiMax transmission and an encrypted 64QAM Mobile WiMax ECM transmission are shown in FIG. 10. It can be seen clearly that decoding the ECM scatter plot is not a trivial task. Decoding is only possible if the keys are known to the receiver.

It is also possible to alter the amplitudes of the pilots or indeed alter the amplitudes of the encrypted data subcarriers if desired as long both the transmitter and receiver are aware of the variations. In this case the method of PAPR reduction as described earlier would have to be employed to adjust the phases appropriately to provide lowest PAPR.

An advantage of the above encryption process is that it is possible to provide an added layer of data security at the same time as reducing the PAPR of the signals, eliminating the channel as well as providing signal mitigation and synchronisation. Further, the encryption can be performed on a per frame basis, or on a per subcarrier basis, making it even harder to decrypt as the keys continually change from frame to frame. This method therefore provides greater security to wireless communications making it harder for intruders to hack and thus assists the upper layers of the protocol stack in their security.

The present invention introduces the ability to embed methods of convolved pilot data comprising information from the data subcarriers in frequency domain or the frequency and time domain. This allows further improvement in eliminating fast fading dynamic multipath due to multi-path correction in both time and frequency domains, as well as simultaneous automatic and controllable reduction in PAPR. Also, the embedded nature of the pilots can be made adaptive to optimise further the PAPR with no loss in receiver BER. Knowledge of the optimised methods does not have to be transmitted to the receiver, i.e. the channel elimination and data recovery methods used at the receiver remain fixed and are transparent to the optimised PAPR reduction methods used at the transmitter. No side information is required to be transmitted. In addition, it can be employed in current standard broadband architectures where the new embedded pilots can replace conventional pilots. Other techniques can be utilised along with the new method, e.g. SLM to further improve further PAPR, or channel coding methods to improve further the BER.

A skilled person will appreciate that variations of the disclosed arrangements are possible without departing from the invention. Accordingly, the above description of the specific embodiment is made by way of example only and not for the purposes of limitation. It will be clear to the skilled person that minor modifications may be made without significant changes to the operation described.

The invention claimed is:

1. A method for optimising at least one Peak to Average Power Ratio (PAPR) in data for transmission over a telecommunications network in the frequency domain using multiple frequency sub-carriers, the method comprising:
   segmenting frequency sub-carriers modulated with data within a data block into a plurality of clusters of frequency sub-carriers;
   embedding a sub-carrier modulated with control data within each cluster of frequency sub-carriers;
   modifying the phase of each data modulated sub-carrier using the phase of the corresponding control data modulated sub-carrier to provide a modified data modulated sub-carrier;
   adding a phase shift to every modified data modulated sub-carrier and adding the same phase shift to every control data modulated sub-carrier within a cluster and determining the PAPR for the added phase shift;
   varying the phase shift added and determining the PAPR for the varied phase shift;
   repeating the step of varying the phase shift added and determining the PAPR for each varied phase shift to determine an optimised PAPR phase shift;
   applying the optimised PAPR phase shift to the modified data modulated sub-carriers and the control data modulated sub-carrier to form a phase shifted cluster; and
   transmitting the phase shifted cluster, wherein the phase shifted cluster is decodable without requiring information on the optimised PAPR phase shift.

2. A method as claimed in claim 1 comprising encrypting real and the control data that is to be transmitted.

3. A method as claimed in claim 2 comprising using a phase scaling factor for the control data and a different phase scaling factor for the real data.

4. A method as claimed in claim 1, wherein each cluster has m entries in the frequency domain and n entries in the time domain, where m and n are each greater than one.

5. A method as claimed in claim 4, wherein identical control data is provided in multiple entries of the cluster.

6. A method as claimed in claim 1, wherein modifying the phase of each data modulated sub-carrier using the phase of the control data modulated sub-carrier involves adding the phase angle of the control data to the phase angle of corresponding real data.

7. A method as claimed in claim 1, wherein the control data modulated sub-carrier has a phase angle that is a function of the phase angles of the data modulated sub-carriers in the cluster in which it is embedded.

8. A method as claimed in claim 7, wherein the phase angle of the control data modulated sub-carrier is the sum of the phase angles of the data modulated sub-carriers in which it is embedded.

9. A method as claimed in claim 1, wherein the cluster is symmetric and the control data modulated sub-carrier is embedded substantially in the middle of real data modulated sub-carriers.

10. A method for transmitting data over a telecommunications network in the frequency domain using multiple frequency sub-carriers, the method comprising:
   segmenting frequency sub-carriers modulated with data within a data block into a plurality of clusters of frequency sub-carriers;
   embedding a sub-carrier modulated with control data within each cluster of frequency sub-carriers;
   modifying the phase of each data modulated sub-carrier using the phase of the corresponding control data modulated sub-carrier to provide a modified data modulated sub-carrier;
   adding a phase shift to every modified data modulated sub-carrier and adding the same phase shift to every control data modulated sub-carrier within a cluster and determining a Peak to Average Power Ratio (PAPR) for the added phase shift;
   varying the phase shift added and determining the PAPR for the varied phase shift;
   repeating the step of varying the phase shift added and determining the PAPR for each varied phase shift to determine an optimised PAPR phase shift;
   applying the optimised PAPR phase shift to the modified data modulated sub-carriers and the control data modulated sub-carrier to form a phase shifted cluster,
   wherein a phase shift is applied to each entry of each cluster and the phase shift is selected; and
   transmitting the phase shifted cluster, wherein the phase shifted cluster is decodable without requiring information on the optimised PAPR phase shift.

* * * * *